US008252350B1

(12) United States Patent
Cadwalader et al.

(10) Patent No.: US 8,252,350 B1
(45) Date of Patent: Aug. 28, 2012

(54) ETHANOL RECOVERY FROM FERMENTATION BROTH

(76) Inventors: Robert E. Cadwalader, Glen Elyn, IL (US); Rex A. Dieterle, Madison, WI (US)

( * ) Notice: Subject to any disclaimer, the term of this patent is extended or adjusted under 35 U.S.C. 154(b) by 887 days.

(21) Appl. No.: 12/313,704

(22) Filed: Nov. 24, 2008

(51) Int. Cl.
*C12G 3/08* (2006.01)
(52) U.S. Cl. ............................... 426/14; 426/11
(58) Field of Classification Search .................. 426/14
See application file for complete search history.

(56) References Cited

U.S. PATENT DOCUMENTS

| | | | |
|---|---|---|---|
| 4,420,561 A | 12/1983 | Chen et al. | |
| 4,448,644 A | 5/1984 | Foster et al. | |
| 4,517,298 A | 5/1985 | Tedder | |
| 4,612,196 A | 9/1986 | Goldstein et al. | |
| 4,888,189 A | 12/1989 | Gnekow | |
| 5,141,861 A | 8/1992 | Dale | |
| 5,160,044 A * | 11/1992 | Tan | 210/634 |

OTHER PUBLICATIONS

Maiorella et al. "Biotechnology Report—Economic Evaluation of Alternative Ethanol Fermentation Processes," Biotechnology and Bioengineering, vol. XXVI, pp. 1003-1025 (1984).*
Kujawski, W. "Application of Pervaporation and Vapor Permeation in Environmental Protection," Polish Journal of Environmental Studies vol. 9, No. 1, pp. 13-26 (2000).*
Choudhury et al "Ethanol Separation From Molasses Based Fermentation Broth by Reverse Osmosis," Biotechnology Letters, vol. 8, No. 10m pp. 731-734 (1986).*
Feng et al. "Liquid Separation by Membrane Pervaporation: A Review," Ind. Eng. Chem. Res. 36, pp. 1048-1066 (1997).*
Baker et al. "Reverse Osmosis" in Membrane Separation Systems—Recent Developments and Future Directions, Noyes Data Corporation, p. 280 (1991).*
Rautenbach, "Process Design & Optimization" in Handbook of Industrial Membrane Technology, Noyes Publications, Ed. M.C. Porter, p. 361(1990).*
Lopez, Alvarez, Riera, S. and Alvarez, R, "Production of Low Alcohol Content Apple Cider by Reverse Osmosis;" *Ind Eng. Chem. Res.*, vol. 41, pp. 6600-6606, 2002.
O'Brien, Roth and McAloon, "Ethanol production by continuous fermentation-pervaporation: a preliminary economic analysis;" *Journal of Membrane Science*, vol. 166, No. 1, pp. 105-111, 2000.
Vienne and Stockar, "An Investigation of ethanol inhibition and other limitations occurring during the fermentation of concentrated whey permeate by *Kluyveromyces fragilis*," Biotechnology Letters, vol. 7, No. 7, pp. 521-526, 1985.
Grubb, C.F and Mawson, A.J., "Effects of elevated solute concentrations on the fermentation of lactose by *Kluyveromyces marxianus* Y-113;" Biotechnology Letters, vol. 15, No. 6, pp. 621-626, 1993.
Urbanchuck, J.M. of LECG, LLC; Renewable Fuels Association Ethanol Industry Report, "Contribution of the ethanol industry to the economy of the united states,"; pp. 1-10, Dec. 2006.

(Continued)

*Primary Examiner* — Elizabeth Gwartney
(74) *Attorney, Agent, or Firm* — Tipton L. Randall

(57) ABSTRACT

A method of separating an aqueous ethanol mixture from an active ethanol fermentation broth. The method comprising the steps of (a) supplying a selected fraction of the fermentation broth to a first reverse osmosis membrane separation stage to generate a dilute aqueous ethanol permeate and a reduced ethanol content fermentation broth retentate; (b) recycling the reduced ethanol retentate to the active fermentation broth; (c) supplying the aqueous ethanol permeate to a second membrane separation stage to generate a concentrated aqueous ethanol retentate and a dilute aqueous ethanol permeate; and (d) recycling the dilute aqueous ethanol permeate of step (c) to the active ethanol fermentation broth. An additional step of processing the concentrated aqueous ethanol retentate to remove water optionally follows.

7 Claims, 7 Drawing Sheets

OTHER PUBLICATIONS

Guimaraes P, Klein J, Doimengues L, and Teixeira, J., "Fermentation Performance of a Recombinant Lactose-consuming Flocculating *Saccharomyces cerevisiae* Strain;" *Brazilian Journal of Food Technology*, pp. 34-39, Mar. 2005.

Wu and Lee, "The Inhibition of the enzymatic hydrolysis of cellulose by ethanol;" *Biotechnology Letters*, vol. 19, No. 10, pp. 977-979, 1997.

Jorgensen, Vibe-Pedersen, Larsen and Felby, "Liquefaction of Lignocellulose at High-Solids Concentrations;" *Biotechnology and Bioengineering*, vol. 96, No. 5, pp. 862-870, 2006.

Taylor, Kurantz, et al. "Effects of ethanol concentration and stripping temperature on continuous fermentation rate," *Applied Microbiology and Biotechnology*, vol. 48, pp. 311-316, 1997.

Scott, J. A. and Cooke, D. E., "Continuous Gas ($CO_2$) Stripping to Remove Volatiles from an Alcoholic Beverage:" *J. Am. Soc. Brew. Chem*, vol. 53, No. 2, pp. 63-67, 1995.

Zhang Wei, Yu Xingju and Yuan Quan, "Ethanol fermentation coupled with complete cell recycle pervaporation system: Dependance of glucose concentration;" *Biological Techniques*, vol. 9, No. 4, pp. 299-304, 1995.

Lewandowska, M. and Kujawski, W. "Ethanol production from lactose in fermentation/pervaporation system;" *Journal of Food Engineering*, vol. 79, pp. 430-437, 2007.

Ikegami T., Yanagishita H., Kitamoto D,, Haraya K, Nakane T., Matsuda H., Koura N. Sano T., "Production of highly concentrated ethanol in a coupled fermentation/pervaporation process using silicalite membrances;" *Biotechnology Techniques*, vol. 11, No. 12, pp. 921-924, 1997.

* cited by examiner

Graph 1

Graph 2

ETHANOL RECOVERY FROM FERMENTATION BROTH

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to economical and technically available processes for the extraction of ethanol from active fermentations and the further concentration of that extract to higher concentrations to permit economical further processing of the ethanol by distillation, pervaporation or other concentration processes. The process is intended to be run on a continuous basis during the fermentation process and to remove ethanol at a removal rate to keep the fermentation in its optimal production phase. Ethanol for all fermentation has an inhibitory effect on the organisms and will eventually kill the organisms if high enough levels are produced. Using this process the fermentation rates can be increased up to 20 fold and the resultant concentrated ethanol water mixtures can be economically processed to a highly concentrated ethanol product.

2. Background Information

The United States is increasingly dependent on imported energy to meet our personal, transportation, and industrial needs. The U.S. imports 65% its petroleum needs today. By 2030, the Energy Information Administration (EIA) projects the U.S. will import 70% of its petroleum. And oil prices are not expected to ease soon. EIA estimates oil prices will hover near or above $100/barrel through 2030. Record oil and gas prices in 2008 underscore the need for energy independence by eliminating that volatility in the market caused by instability and conflict in oil-producing parts of the world.

To address this concern, and building upon the Energy Policy Act of 2005 (the first comprehensive energy bill in more than a decade), President Bush announced his Advanced Energy Initiative in the 2006 State of the Union Address with focus on reducing U.S. gasoline usage by 20% in the next ten years-Twenty in Ten (Strengthening America's Energy Security). This goal will be achieved by 1) increasing the supply of renewable and alternatives fuels by setting a mandatory fuels standards to require 35 billion gallons of renewable and alternative fuels in 2017-nearly five times the 2012 target now in the law, and 2) Reforming and modernizing corporate average fuel economy (CAFE) standards for cars and extending the current light truck rules.

As a domestic, renewable source of energy, ethanol can reduce our dependence on foreign oil and increase the United States' ability to control its own security and economic future by increasing the availability of domestic fuel supplies. In 2006, the production and use of ethanol in the U.S. reduced oil imports by 170 million barrels, saving $11 billion from being sent to foreign and often hostile countries (Source: LECG, LLC December 2006). This ethanol is typically fuels and traditional uses like livestock and poultry feed, food processing and exports. Therefore, efficiently producing ethanol from cellulosic feedstock would provide large, new sources of raw materials for the production of renewable fuel. However, the cellulosic ethanol is not commercially produced in the United States today.

A major problem, which has long plagued the ethanol fermentation process, is that the yeasts and bacterial used to produce ethanol have their growth inhibited and they can be killed with the very ethanol that they are producing. This problem will increase, as fermentation of alternative feedstock other than corn or sugar cane is required. All yeasts and bacteria that can ferment the alternate feedstock have a much lower tolerance to ethanol.

If the biomass contains or can be converted to glucose it can be fermented as the corn ethanol process. The standard fermentation yeast used today is *Saccharomyces cerevisiae* If the biomass conversion yield other sugar types the fermentation process must use non-standard yeasts and bacteria to ferment the sugar to ethanol. Lactose is a good example of a non-glucose sugar in milk that is a waste product of the cheese industry. It can be converted to ethanol but the process shows much ethanol inhibition with the normal fermentation yeast *Kluyveromyces fragilis* (Vienne and Stockar 1985) (Grubb and Mawson 1993) or with Recombinant *S. cerevisiae* (Guimaraes P, Klein J, Doimengues. L, and Teixeira, J (2005).

Generally, less than half of the alternate feedstock materials will convert to glucose. The other sugars are a mix of difficult to ferment hexose and pentose sugars. Some of the fermentation alternative types of microorganisms that have potential to convert the other sugars to ethanol are *Pichia stipitis*, recombinant *Escherichia coli*, *Zymomonas mobilis*, various recombinant *Saccharomyces* various species, *Candida shehatae*, *Pachysolen tannophilus*, etc. Most or all of these fermentation alternatives experience significant ethanol inhibition at low ethanol concentrations.

The inhibition of cell growth at low ethanol concentration delays fermentation times greatly. Conversion of sugars to ethanol can take place in non-growing cells, however higher levels of ethanol will also stop that conversion.

Ethanol concentration inhibition also has the effect of inhibiting the enzymatic conversion of cellulose and hemicelluloses to fermentable sugars during fermentation by organisms of added external enzymes. Ethanol has been proven to be inhibitory of the cellulases enzymes (Wu and Lee, 1997). Levels are very low in the 2%-3% v/v range (Jorgensen, Vibe-Pedersen, Larsen and Felby, 2006).

Ethanol removal from fermentation broths is possible and much study has been given to it to date. However no processes are commercially viable at this time. The main method for ethanol removal during fermentation at this time has been the use of hydrophobic pervaporation membrane processes. Earlier methods of continuous ethanol removal by stripping with CO2 (U.S. Pat. No. 5,141,861 1992 Clark Dale) or other gasses, solvent extraction with a raffinate solvent, (U.S. Pat. No. 4,517,298 1985 Tedder), Zeolite or other resin sorbents (U.S. Pat. No. 4,420,561 1983 Chen), Extraction and Distillation (U.S. Pat. No. 4,448,644 1984 Foster), Packed column counter current water/gas stripping (Taylor, Kurantz, et all, 1997), tower fermentors with striping (Scott and Cooke, 1995) and many other methods have been tried with no commercial success.

Many studies have also been done on the use of hydrophobic pervaporation membranes in batch and continuous fermentations with some success also. The particularly good news is that ethanol inhibition is reduced. Improvements in ethanol productivity were obtained by 1.58 and 1.86 times. (Zhang Wei, Yu Xingju and Yuan Quan 2000) Other studies show that the ethanol production rate fermenting lactose to ethanol can be increased from 1-2 g/L/Hr to 10 g/L/Hr removing ethanol in a continuous system. (Lewandowska and Kujawski 2007) A typical base rate for corn ethanol production rate is 1-3 g/L/Hr.

O'Brien of the USDA Eastern Regional Research Center has studied the process and economics in general since 1999. In his 1999 model of the fermentation-pervaporation, process continuously higher fermentation conversion and ethanol production rates can be increased for the normal fermentation by 12 times. He therefore needed on one twelfth the reactor volume of the normal fermentation. Pervaporation increased the ethanol concentration from 7.1% in the pervaporation feed to 42% ethanol in the pervaporation permeate. The economics of doing this was not positive however. The total cost to produce of amortized capitol and operating costs were $0.192 for the fermentation/pervaporation process vs. $0.182 for the base ethanol plant. (O'Brien et al. 2000)

The problem with using a hydrophobic pervaporation/fermentation system is three fold. First, the costs of the membranes are still very high. Second, the process requires high vacuums and refrigeration to condense the ethanol. Third the performance drop off from the membranes can be significant due to fouling during operation. Fermentation by products, such as succinic acid and glycerol, can cause membrane fouling. (Ikegami et all, 1997, 2000)

Applicants have devised an economical process for recovering ethanol from an active fermentation broth that is an improvement over the existing technologies.

SUMMARY OF THE INVENTION

The invention is directed to a process for recovering ethanol from an active fermentation broth. The present invention uses existing RO membrane technology to remove ethanol from fermentation broths with known performance parameters and very low membrane cost. Much of what is accomplished with pervaporation systems can be duplicated with RO membranes, but using a more conventional process of pressures and temperatures. The use of RO membranes to remove ethanol from fermentation broths is over 20 years old. This process was developed to make low alcohol beverages, primarily by the beer industry. (U.S. Pat. No. 4,612,196 Goldstein Miller Brewing Co 1986)

Low alcohol beer and wines can be produced with alcohol concentrations a low as 0.5% v/v. under batch or continuous conditions. (U.S. Pat. No. 4,888,189 Gnekow Ariel Vineyards 1989). The permeation rates and operating pressures are similar to those expected for water purification and separation in RO processes operating within the 200 to 800 PSI range with permeation fluxes of 10 to 40 L/m2/hr can be expected. (Lopez, Alvarez, S, Riera and Alvarez, R, 2002)

The previous work to produce low alcohol beers was done on non-active fermentations and on a batch basis. Also the ethanol extracted with the permeate was not of primary importance to the process as the remaining beer (or retentate) was the primary product. The present invention operates on an active fermentation broth, with the purpose of extracting ethanol from the fermentation broth to keep the ethanol concentration at a sufficiently low level to give optimal fermentation conditions for product production and microbial growth. Because ethanol must be extracted from a fermentation broth, and many fermentations produce ethanol at very low levels of 1% to 3%, the reverse osmosis membranes used for the extraction cannot concentrate ethanol to the levels necessary for further concentration of the ethanol by distillation or other concentration methods. The extracted ethanol and water solution from the process of the present invention described herein then are further concentrated with low cost reverse osmosis membranes and/or pervaporation membranes specific for ethanol concentration.

The present invention encompasses the use of two Reverse Osmosis operations and the interaction between the two, to optimally extract a purified stream of ethanol and water from an active fermentation broth and to concentrate that stream for economical further processing. The present invention also encompasses the use of pervaporation in place of or after the second RO system to concentrate the ethanol extracted by the first RO system. The first RO system provides a very clean stream for feeding the pervaporation system to further concentrate the low levels of ethanol to higher concentration levels to feed a distillation system or dehydration system.

A side stream from the fermentor, of as low as 10-15% of the volume per hour, is processed to remove ethanol and water at or slightly above the ethanol concentration in the fermentor. All the biomass and nutrients remain in the fermentor because of the tight pore structure of the RO membranes. Some salts and undesirable volatile acids, such as acetic acid, is removed with the cleaned ethanol and water stream. This stream is concentrated to 20% or more ethanol with a second RO membrane process and/or pervaporation technologies. The concentrated aqueous ethanol is then sent to the distillation system. The permeate stream from the second RO process and/or pervaporation technologies, containing some ethanol and water is recycled back to the fermentor.

In a preferred embodiment of the invention, the method comprising the steps of (a) supplying a selected fraction of the active ethanol fermentation broth to a first reverse osmosis membrane separation stage to generate a dilute aqueous ethanol mixture permeate and a reduced ethanol content fermentation broth retentate; (b) recycling the reduced ethanol content fermentation broth retentate to the active ethanol fermentation broth; (c) supplying the dilute aqueous ethanol mixture permeate to a second membrane separation stage to generate a concentrated aqueous ethanol mixture retentate and a dilute aqueous ethanol mixture permeate; and (d) recycling the dilute aqueous ethanol mixture permeate of step (c) to the active ethanol fermentation broth.

DESCRIPTION OF THE EMBODIMENTS

The invention is a method of separating and removing an aqueous ethanol mixture from an active ethanol fermentation broth. The method comprising the steps of (a) supplying a selected fraction of the active ethanol fermentation broth to a first reverse osmosis membrane separation stage to generate a dilute aqueous ethanol mixture permeate and a reduced ethanol content fermentation broth retentate; (b) recycling the reduced ethanol content fermentation broth retentate to the active ethanol fermentation broth; (c) supplying the dilute aqueous ethanol mixture permeate to a second membrane separation stage to generate a concentrated aqueous ethanol mixture retentate and a dilute aqueous ethanol mixture permeate; and (d) recycling the dilute aqueous ethanol mixture permeate of step (c) to the active ethanol fermentation broth. An additional step of processing the concentrated aqueous ethanol mixture retentate to remove water may optionally follow.

The second membrane separation stage includes either a reverse osmosis membrane separation or a pervaporation membrane separation.

Figure 1:
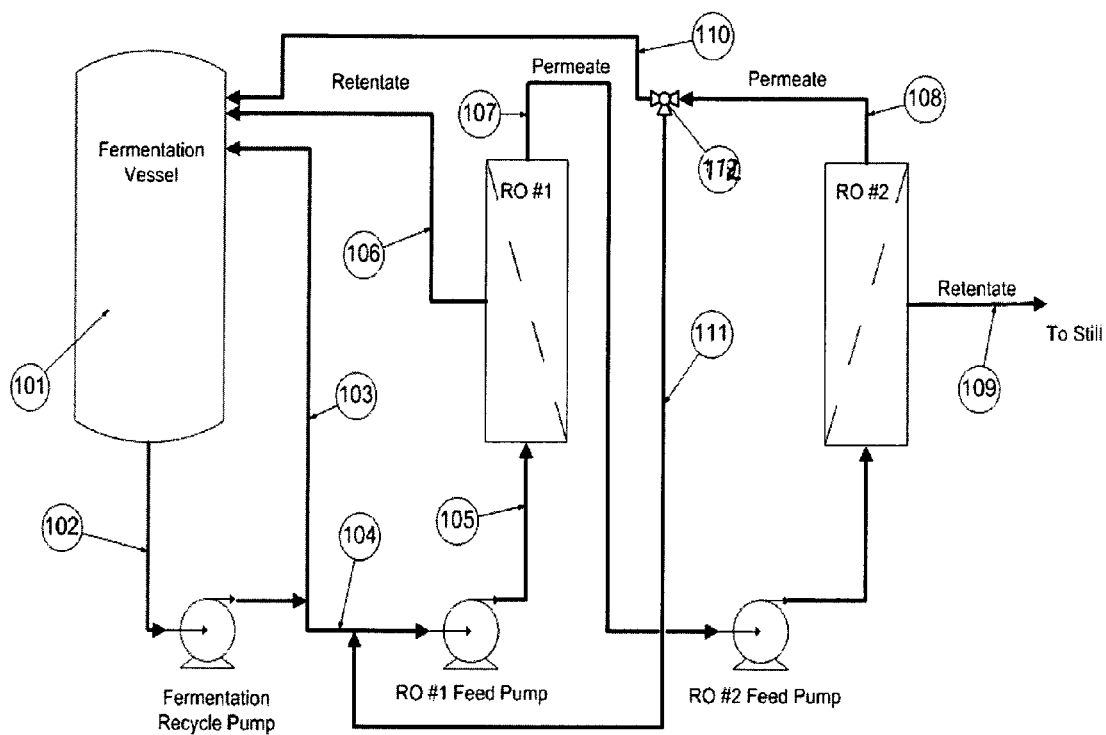
FIG. 1 is a schematic illustration of the invention process to extract ethanol during active fermentation, concentrate the extracted ethanol and provide a feed to a further ethanol concentration process.
Figure 2:
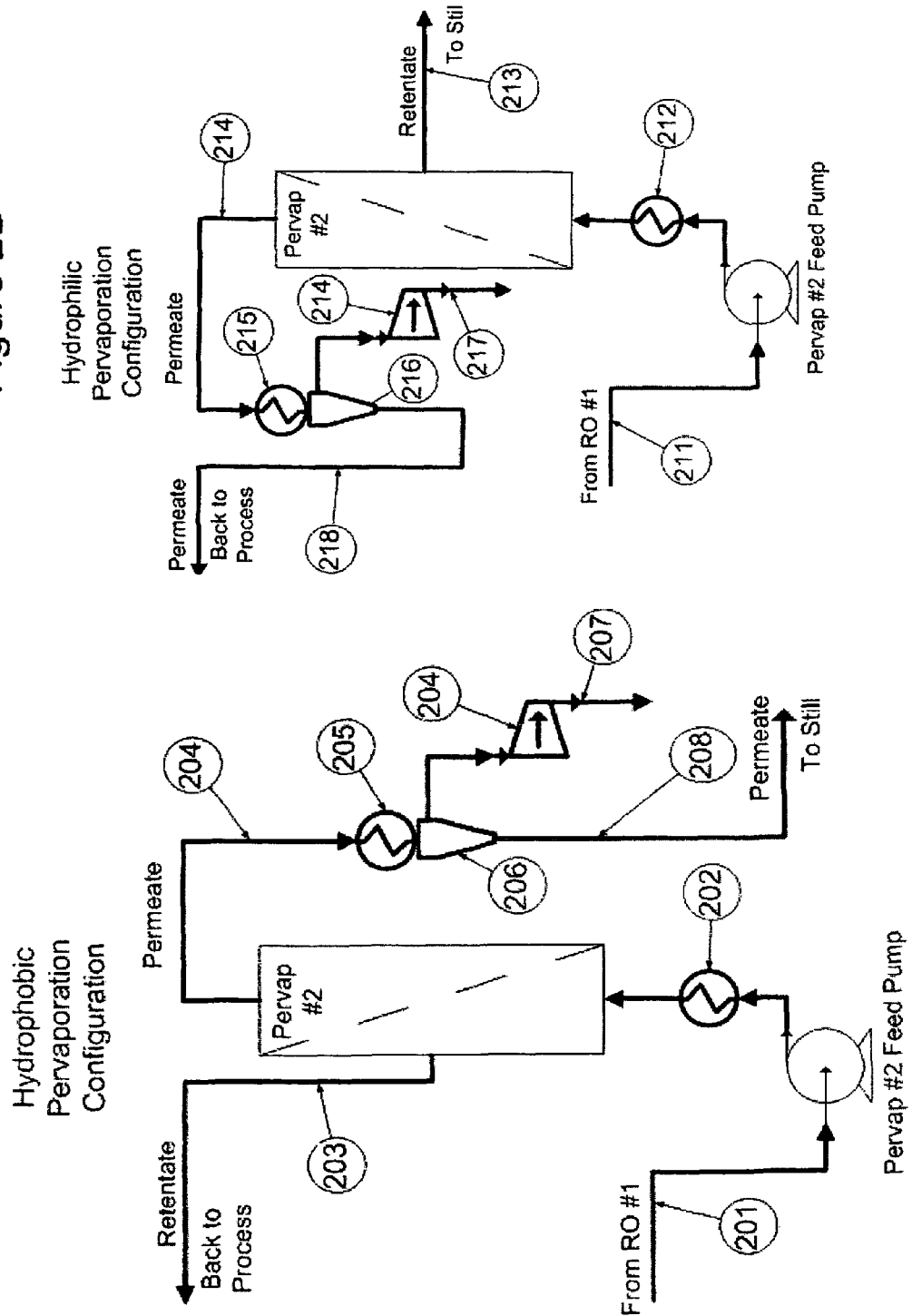
FIG. 2a is a schematic illustration of one alternative embodiment of the second membrane separation stage of the present invention.
FIG. 2b is a schematic illustration of another alternative embodiment of the second membrane separation stage of the present invention.
Figure 3:
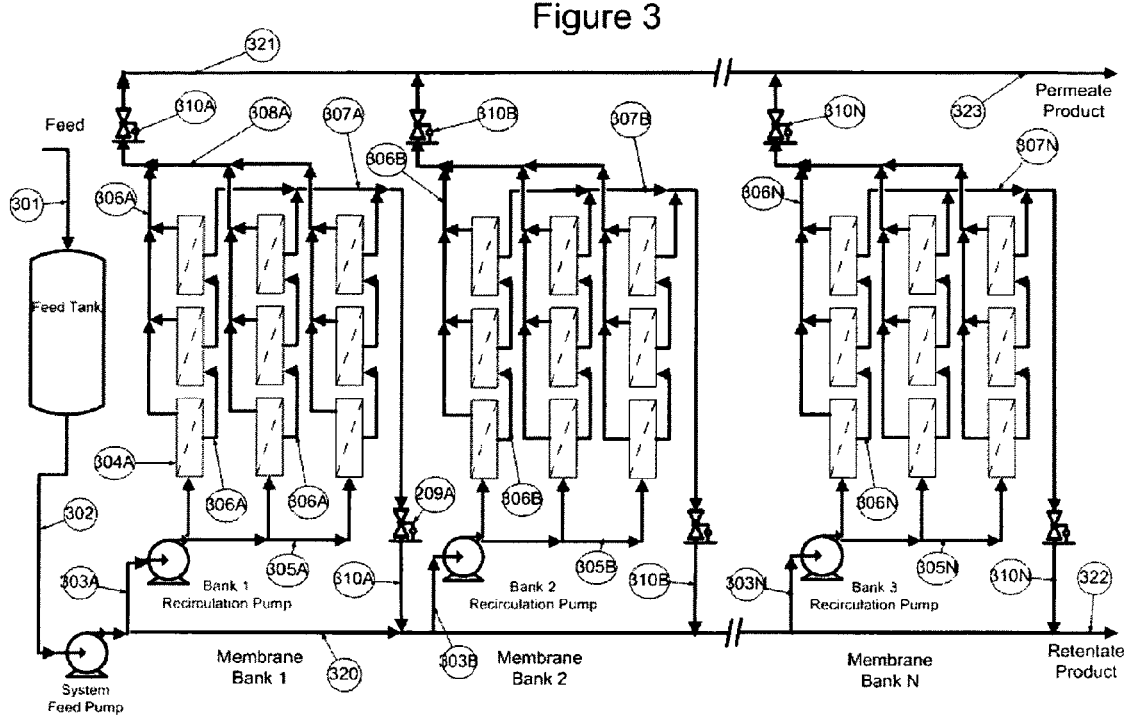
FIG. 3 is a schematic illustration of multiple banks in one of the reverse osmosis membrane separation stages of the present invention.

FIGS. 1, 2a and 2b are schematics illustration of the process to extract aqueous ethanol during active fermentation, concentrate the extracted ethanol and provide an aqueous ethanol feed solution to a further ethanol concentration step, such as a still or other process, to further concentrate ethanol. FIG. 3 is a standard configuration of a standard RO and pervaporation system.

The following is an overview of the process. The examples further illustrate how the basic invention is used in various forms, without limiting the scope of the present invention.

FIG. 1 illustrates the system using Reverse Osmosis membrane separation as the second concentration step in the process. A portion of the fermentation broth (102) is continuously removed from the fermentation vessel (101) by the fermentation recycle pump, typically to aid mixing and to control the reaction temperature, and then recycled back to the fermentation vessel (103). Part of that recycle stream (103) is sent continuously to the ethanol extraction process. The pressure of that stream is increased by the RO #1 Feed Pump and the stream (104) is sent to the first Reverse Osmosis system (RO #1), which extracts ethanol from the stream. The feed pump increases the feed stream to pressures of 200 PSI to 1000 PSI.

The purpose of the first RO separation stage is to remove and purify an ethanol and water solution for further processing. The separated ethanol and water solution, permeate (107), is sent forward for further concentration. The type of membrane used in this step can include cellulose acetate and other membrane chemistries that allow the permeation of both water and ethanol. The permeate stream volume is a fraction of the feed, generally from 30% to 75%, depending on the selection of the membranes for this process, the operating temperatures and pressures, and the ethanol concentrations in the fermentation broth. Typically, the permeate ethanol concentration is at, slightly below or slightly above the concentration of the fermentation broth, depending on the operating conditions and the membrane chemistry selected.

The RO membranes may include several different configurations including, tubular, hollow fiber, plate and frame, and spiral. The fiber and particulate content of the fermentation feedstock requires careful selection of the flow channel in the membrane module to prevent plugging during operation.

The remaining fermentation broth, the retentate (106), is directed back to the fermentor. This retentate stream changes the fermentation environment as little as possible through the proper selection of membranes and operating conditions. The reduced ethanol content of the retentate (106) also reduces ethanol inhibition within the active fermentation broth. The RO membranes selected for this process either reject or retain a very high concentration of the essential substrates, nutrients, growth factors and other materials necessary for optimal fermentation conditions.

RO #2 feed pump accepts the permeate stream (107) from process RO #1 and increases the pressure of the stream. The pressurized stream is routed to a second reverse osmosis separation stage for further ethanol concentration. The feed pump for RO #2 increases the feed stream to a pressure of 200 PSI to 1200 PSI. RO #2 operates as the reverse of process RO #1. Here the purified ethanol stream is further concentrated to higher ethanol in water concentrations for economical further processing. Membranes of the type polyacrylonitrile, polyamide composites and others with ethanol retention greater than 30% are used. Concentration factors of 40% to 85% permit the concentration of ethanol from 1%-2% up to 20%+, depending on the overall design of the system, the system operating conditions and the economics of further processing.

The concentrated aqueous ethanol stream, or the retentate (109), is the product of the process of the present invention and leaves the system for further processing, if necessary, by pervaporation, distillation, and/or dehydration. Aqueous ethanol concentrations in the 20% range are provided by the system.

The water removed from the RO #2 process, the permeate stream (108), is recycled back to the fermentation vessel (101) or recycled back to the input of the process RO #1 (111). The 3-way valve (112) demonstrates how this can be accomplished. When recycled back to the fermentation vessel (101), the reduced ethanol content of the permeate stream (108) also reduces ethanol inhibition within the active fermentation broth.

Since water is removed from the process, some make up water may be required, along with additional substrate and nutrients for addition to the fermentation vessel, making this a continuous fed batch reactor process. The exact amount depends on the rate of conversion of substrate to ethanol and minor nutrient loss through the membranes of the system.

In an alternative embodiment of the invention, a second stage pervaporation process (Pervap #2) is employed in two different configurations, dependent on the selection of pervaporation membrane types. A hydrophobic pervaporation membrane selection concentrates the ethanol in the permeate while a hydrophobic pervaporation membrane removes water in the permeate and concentrates ethanol in the retentate. Pervaporation membranes are of many types, both organic and inorganic, such as ceramics coated with zelolite, silicalite membranes, polydimethylsiloxane membranes, polytetrafluorothylene membranes and others. The pervaporatrion membranes may be in several different configurations including, tubular, plate and frame, and spiral.

In the hydrophobic configuration, FIG. 2a, the pervaporation #2 feed pump accepts the permeate stream (201) from the first stage process RO #1, which operates a described above. The permeate stream (201) is routed to Pervap #2 for ethanol concentration. The feed pump increases the feed stream to a pressure of 200 PSI to 500 PSI. The stream is heated to an optimal temperature for the pervaporation process by a heat exchanger (202). The added heat provides the driving force for the pervaporation operation in conjunction with a vacuum on the permeate side of the membrane supplied by the vacuum pump (207). Operating temperatures can range from 80° F. to 500° F. depending on membrane type. Because all biologically active and sensitive materials were removed from the process stream in the RO #1 process, the system of the invention permits higher temperatures and pressures to improve the operation of the second stage pervaporation process, with higher condensation temperatures for reduced operational costs and ease of operation.

In FIG. 2a, ethanol and water passes across the membrane in the vapor state. Ethanol is selected for and passes in higher concentrations than in the feed. A reduced pressure or vacuum is placed on the permeate side of the membrane to vaporize the fluids. The reduced pressure is provided to the system by vacuum pump (207). Because the permeate side of the membrane is in the vapor state, the vapor is typically converted to a liquid in a condenser (205) and collected in a vapor/liquid separator (206), which separates out the non-condensable vapors, which pass to the vacuum pump (207).

The condensed, concentrated aqueous ethanol, or the permeate (208) is the product of the process of the present invention and leaves the system for further processing if necessary with further pervaporation, distillation, and/or dehydration. Ethanol concentrations in the 6% to 50% range leave the system.

The retentate of the process (203), which contains residual amounts of ethanol in water, is recycled back to the fermentation vessel or recycled back to the input of the first stage membrane process, RO #1, as described previously.

Since water is removed from the process, some make up water may be required, along with new substrate and nutrients, which is added to the fermentation vessel, making the present invention a continuous feed batch reactor process. The exact amount of water, nutrients and substrate added depends on the rate of conversion of substrate to ethanol and minor nutrient losses through the membrane system.

In the hydrophilic configuration, FIG. 2b, the pervaporation #2 feed pump accepts the permeate stream (211) from the first stage membrane process, RO #1. The stream is routed to Pervap #2 for ethanol concentration. The feed pump increases the feed stream to a pressure of 200 PSI to 500 PSI. The stream is heated to an optimal temperature for the pervaporation process by a heat exchanger (212). The added heat provides the driving force for the pervaporation operation in conjunction with a vacuum on the permeate side of the membrane supplied by the vacuum pump (214). Operating temperatures can range from 80° F. to 500° F. depending on membrane type. Because all biologically active and sensitive materials were removed from the process stream in the RO #1 process, the process of the invention permits higher temperatures and pressures to improve the operation of the second stage pervaporation process with higher condensation temperatures for reduced operational costs and ease of operation.

In FIG. 2b, ethanol and water pass across the membrane in the vapor state. Water is selected for and passes in higher concentrations than in the feed. A reduced pressure or vacuum placed on the permeate side of the membrane vaporizes the fluids. The reduced pressure is provided to the system by vacuum pump (214). Because the permeate side of the membrane is in a vapor state, the vapor is typically converted to a liquid in a condenser (215) and collected in a vapor/liquid separator (216), which separates out the non-condensable vapors (217), which pass to the vacuum pump.

The condensed concentrated water, or the permeate (218), which contains residual amounts of ethanol in water is recycled back to the fermentation vessel or recycled back to the input of the first stage process RO #1.

The retentate of the process (213) is the product of the process of the present invention and leaves the system for further processing, if necessary, with further pervaporation, distillation, and/or dehydration. Ethanol concentrations in the 10% to 99% range leave the system As above, since water is removed from the process, some make up water may be required, along with new substrate and nutrients, which is added to the fermentation vessel, making the present invention a continuous feed batch reactor process. The exact amount of water, nutrients and substrate added depends on the rate of conversion of substrate to ethanol and minor nutrient losses through the membrane system.

The membrane filtration systems described as RO #1 and RO #2/Pervap #2 take the standard configuration of standard RO systems, particularly as used in the food, dairy and beverage industry. The retentate flow channel of the membrane configuration selected must be such that no particulates from the fermentor are trapped in the same flow channel. This is accomplished by removing the fiber up front in the process, converting the fiber enzymatically to simple carbohydrates, or by using an open channel or a channel with a flow promoter that does not collect fibrous material.

FIG. 3 illustrates, in brief, another embodiment of a typical membrane filtration system used in this invention. Feed to the membrane system (301), be it from the fermentation vessel as in RO #1 or the permeate from RO #1 to the RO #2/Pervap #2 system, is temporarily held in a surge leveling feed tank and then fed (302) to the membrane filtration system by a system feed pump that supplies the fluid motivation through the system and also supplies the processing pressures necessary for RO filtration.

The system feed pump supplies feed to the retentate flow header (320), which feeds one or more banks of membrane filtration units, each circulating the feed through the filtration bank, thereby removing a portion of the feed material as permeated and sending the more concentrated feed back to the retentate header to be further processed by succeeding filtration banks.

Each filtration bank is a matrix of one or more filtration membrane units (304 A to N) and a bank recirculation pump, which supplies the bank feed flow quantities and flow speeds through the membrane units for optimal filtration. The filtration bank membrane arrangement can be two or more units in a flow serial arrangement, if desired, where the retentate flow from one unit becomes the feed for a second unit (305 A to N). There can also be one or more serial flow arrangements in parallel (306 A to N).

The pressure within the bank is controlled by a pressure and flow regulating valves (309 A to N) which work together with the bank recirculation pump, which can also be flow controlled, to give the optimal flow and pressure parameters to the bank. The flow through the regulating valve (310 A to N) is directed back to the retentate header and recirculated back through the filtration bank and/or a portion of the retentate flows forward to be taken up and recalculated through succeeding filtration banks for further filtration and concentration.

The permeate flow from the units (306 A to N) is directed to a permeate header (308 A to N) and its flow from the system is controlled by a flow control valve (310 A to N). It then flows to a permeate collection header (321).

The two products from the membrane filtration system are the retentate and permeate streams. The retentate product (322) is the final retentate left after being processed by the one or more filtration banks. The permeate product (323) is the combined flows of permeate of the one or more filtration banks.

EXAMPLES

Example 1

Fuel grade ethanol is produced from corn. A common "state of the art" method to produce fuel grade ethanol utilizes the Very High Gravity (VHG) dry milling corn process that produces a final concentration of ethanol of 110 gm/liter (14% v/v) starting with a fermentable sugar and starch solution of about 240 g/L. High ethanol concentrations are important to save energy in ethanol production. Old technology corn to ethanol fermentations produce ethanol concentrations of 50 g/L to 65 g/L and require about twice as much energy to convert the dilute ethanol to pure ethanol than would a starting ethanol concentrations of 110 g/L.

Over the course of a batch process time of 40 to 60 hours, various strains of Saccharomyces cerevisiae conditioned for high osmotic pressures of sugar and starch, with the help of additions of starch to sugar conversion enzymes, convert the resultant sugars to ethanol with an average conversion rate of 1.5 g/L/Hr to 2.5 g/L/Hr of ethanol production. The starch cannot be fully converted to sugars in this method or the osmotic sugar pressure inhibits yeast growth and ethanol production, therefore enzymes are added to slowly convert the starch to sugar to supply fresh sugar for the yeast to process.

However, there is a low production start up phase and then a low production ethanol inhibition and cell death phase, which gives the fermentation an overall low production rate. If the fermentation could be kept at its optimal range, a production rate of 6 g/L/Hr to 20 g/L/Hr could be achieved.

Figure 7A:
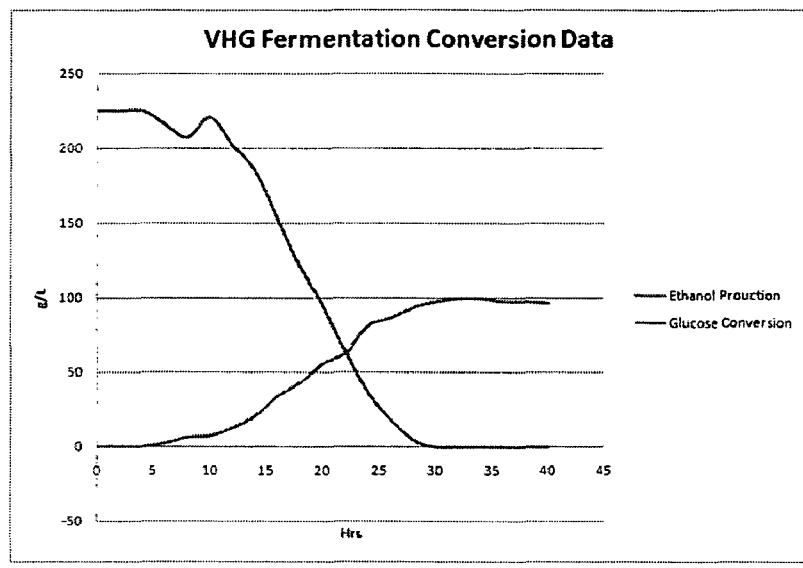
FIGS. 7a and 7b are graphical representations of conversion data for components of a typical ethanol fermentation system.
Figure 7B:
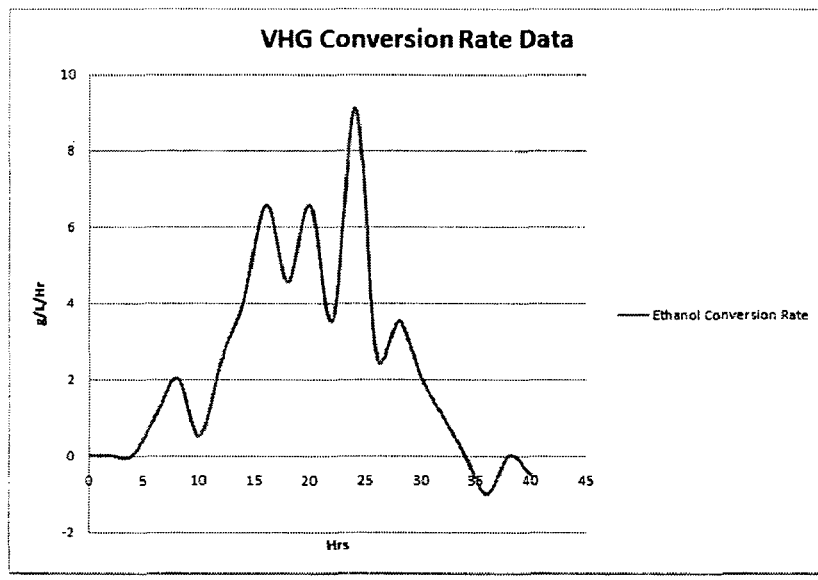

Published data show this phenomenon in Graph 1 and Graph 2 of FIGS. 7a and 7b, from Taylor, F. et al. 2001, "Fermentation and Costs of Fuel Ethanol from Corm with Quick-Germ Process." Applied Biochemistry and Biotechnology Vol. 94 (1): 41-49.

When the fermentation is kept at its optimal production rate of about 6 g/L/Hr for this example, the fermentation time is reduced by 2 to 3 times, with fermentation time to completion of 15 to 20 hours. Hence, the overall facility production can be at the very least doubled with the same fermentation equipment. To permit the fermentation to be kept at its optimal rate, the ethanol concentration must be kept at about 50 to 60 g/by the removal of ethanol from the fermentation broth.

This example describes a single fermentor system capable of producing a base level of 15 Million Gallons per Year (MGY) ethanol. The overall volume of the fermentor is 1 million gallons and filled to about 825,000 gallons. By increasing the fermentation rates to 6 g/L/hr., the overall fermentor production would be a nominal 35 MGY.

Figure 4:
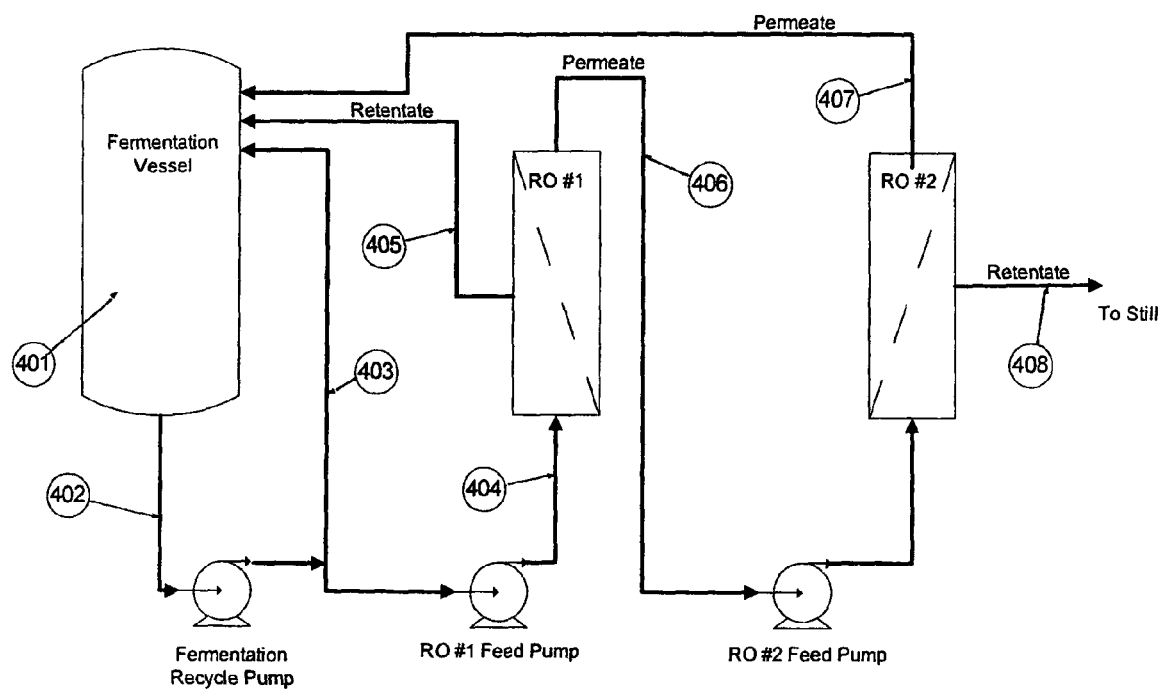
FIG. 4 is a schematic illustration of the process to extract ethanol during active fermentation, concentrate the extracted ethanol and provide a feed to a further ethanol concentration process.

The process of the present invention in this example, shown in FIG. 4, is operated with the following parameters. The fermentation vessel (401) is started with a bioreactor volume of 3,122,625 KG (825,000 Gals) and after a start up yeast growth phase reaches a steady state ethanol concentration of 55 G/L. At that time the ethanol production rate is 6 g/L Hr and the total fermentor ethanol production rate is 18736 KG/HR of pure ethanol. Several fermentation vessels with the combined volume stated can be used. The fermentation temperature is controlled in a range of 95° F. to 105° F., by recycling 1,247,400 KG/HR (5500 GPM) (402) out of the fermentor to be cooled.

A portion of the recycle stream is processed through the invention to continually remove a portion of the ethanol produced to keep the ethanol level at the target concentration. A feed stream of 738,500 KG/Hr (3210 GPM) of fermentor solution is routed to RO #1 (404). The stream contains 700,000 KG/HR of water and 38,500 Kg/HR of ethanol. The remaining recycle stream (403) of 508,900 KG/Hr (2290 GPM) is processed through heat exchange equipment and is directly recycled back to the fermentor.

The objective of the first system RO #1 is to remove a clean stream of ethanol and water from the fermentation broth. It is a series parallel arrangement of 28,000 $M^2$ of cellulose acetate membranes, in this case Koch CA 111112-11221. RO #1 is operated at a pressure of 700 PSI to 1200 PSI and the temperature is controlled to 95° F. to 110° F. These operating parameters deliver a permeation rate of 15 LMH, ethanol rejection −5% to −15% and a concentration factor of 2 to 3 times. Only ethanol and water are removed from the feed stream in the permeate (filtrate) and the retentate (or concentrate), containing all other fermentation constituents, is recycled back to the fermentor. The ethanol is slightly concentrated in the permeate.

The retentate (405) consists of a total stream of 296,878 KG/HR (1,217 GPM) consisting of 280,000 KG/HR of water and 16,878 KG/HR of water. The ethanol concentration is slightly less than the feed to the system.

The permeate (406) from RO #1 is the feed stream to RO #2. The feed stream consists of 420,000 KG/HR of water and 23,790 KG/HR of ethanol and little else. The permeate has a concentration of 57 G/L of ethanol and little else.

A second system RO #2 concentrates the ethanol from RO #1 to an ethanol concentration of 100 to 140 G/L or 12% v/v to 17% v/v. It is a series parallel arrangement of 18,000 $M^2$ of PA TFC composite polyamide membranes, in this case Koch PA TFC 111112-11221. RO #2 is operated at a pressure of 500 PSI to 1000 PSI and the temperature controlled to 95° F. to 110° F. These operating parameters deliver a permeation rate of 40 LMH, ethanol rejection 40% to 70% and a concentration factor of 2 to 4 times. The product of RO #2 and the product of the overall process of the present invention is the retentate of the system. The permeate is the water removed from the feed stream, which contains a reduced amount of ethanol.

The permeate stream form RO #2 (407) is routed back to the fermentation vessel to retain the ethanol in the stream. The stream consists of 275,172 KG/HR of water and 4147 KG/HR of residual ethanol.

The product of the system (408) is the retentate from RO #2. 164,054 KG/HR (679 GPM) has ethanol concentrations of 130 g/L or 17% v/v ethanol. This product stream is of an ethanol concentration at or higher than that produced by the VHG process and optimal for feed to a distillation process to produce fuel grade ethanol.

The volume of the fermentor is reduced by the 164,054 KG/HR (679 GPM) by the withdrawal of the ethanol and water product for further processing. This volume loss in the fermentor can completely reduce the fermentor volume over the length of the fermentation period, which generally matches the fermentation completion time. This volume loss can be replaced with water to keep the fermentor at a constant level or at some minimal level as the fermentation proceeds over the new reduced fermentation times of 15-20 hours to completion.

Example 2

This example is an improvement on Example 1 and accomplishes the high ethanol concentration product, but uses conventional fermentation yeasts. The process is run as continuous fed batch fermentation with the addition of fully converted starch sugars in quantities to exactly match the amount of ethanol produced and then removed from the fermentation reaction. This method permits lower cost conventional starch to sugar methods, the pre-filtering and recovery of higher quality ancillary corn feed and chemical products now recovered from the processes fermentation broth as still bottoms, and eliminate stuck fermentations, the fermentations that do not go to completion, in the VHG process.

Because this process is continuous, the start up conditions are only a small fraction of the total fermentation time. With this method, the fermentation can be carried on for weeks to months at a time and remains at a constant, high ethanol production rate. The process of the present invention makes this process possible as all the ethanol being continuously produced and a portion of the water is continually removed from the system, permitting the addition of concentrated sugar solutions to the fermentor at a rate to match the conversion the sugars to ethanol. The RO membranes selected retain most or all of the nutrients and growth factors within the fermentor.

The ethanol production rates for this example are considered the same as example 1. It is expected that after a fermentation start up period, higher production rates, in the in the 8 g/L/Hr to 16 g/L/Hr, will be achieved due to higher yeast cell concentrations achieved by the retention of cell mass within the fermentor and a less stressful environment as sugar concentrations are kept low to just match the sugars taken up and converted the ethanol.

Figure 5:
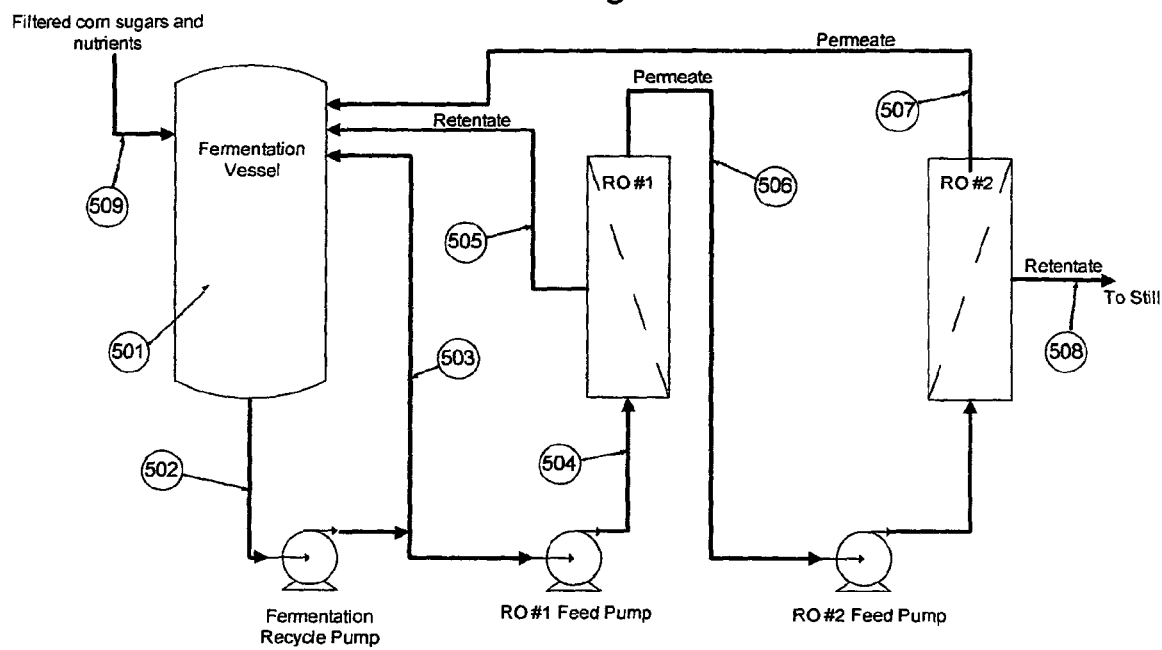
FIG. 5 is a schematic illustration of the process to extract ethanol during active fermentation, concentrate the extracted ethanol and provide a feed to a further ethanol concentration process.

The invention in this example, shown in FIG. 5, is operated with the following parameters. The fermentation vessel (501) is started with a bioreactor volume of 3,122,625 KG (825,000 Gals) and reaches a steady state ethanol concentration of 55 G/L. Several fermentation vessels with the combined volume stated can be used. The starting sugar concentration is only 110 g/L and no unconverted starch is necessary. The fermentation broth can consist of fully converted corn sugars and the un-fermentable parts of the corn are filtered to remove high quality animal feed and other chemicals, such as the zien proteins and other useful chemicals.

As described in Example 1, the ethanol production rate is set at of 6 g/L Hr. The total fermentor ethanol production rate is 18736 KG/HR of pure ethanol. The fermentation temperature is controlled in a range of 95° F. to 105° F., by recycling 1,247,400 KG/HR (5500 GPM) (502) out of the fermentor to be cooled.

A portion of this stream is processed through the invention to continually remove the amount of ethanol produced to keep the ethanol level at the target concentration. A feed stream of 738,500 KG/Hr (3210 GPM) of fermentor solution is routed to RO #1 (504). The stream contains 700,000 KG/HR of water and 38,500 Kg/HR of ethanol. The remaining recycle stream (503) of 508,900 KG/Hr (2290 GPM) is processed through heat exchange equipment and is directly recycled back to the fermentor.

The first system RO #1 functions to remove a clean stream of ethanol and water from the fermentation broth. It is a series parallel arrangement of 28,000 M² of cellulose acetate membranes, in this case Koch CA 111112-11221. RO #1 is operated at a pressure of 700 PSI to 1200 PSI and the temperature controlled to 95° F. to 110° F. These operating parameters deliver a permeation rate of 15 LMH, ethanol rejection −5% to −15% and a concentration factor of 2 to 3 times. Only ethanol and water are removed from the feed stream in the permeate (filtrate) and the retentrate (or concentrate), containing all other fermentation constituents, is recycled back to the fermentor. The ethanol is slightly concentrated in the permeate.

The retentate (505) consists of a total stream of 296,878 KG/HR (1,217 GPM) consisting of 280,000 KG/HR of water and 16,878 KG/HR of water. The ethanol concentration is slightly less than the feed to the system.

The permeate (506) from RO #1 is the feed stream to RO #2. The feed stream consists of 420,000 KG/HR of water and 23,790 KG/HR of ethanol and little else. The permeate has a concentration of 57 G/L of ethanol and little else.

A second system RO #2 concentrates the ethanol from RO #1 to ethanol concentrations of 100 to 140 G/L or 12% v/v to 17% v/v. It is a series parallel arrangement of 18,000 M² of PA TFC composite polyamide membranes, in this case Koch PA TFC 111112-11221. RO #2 is operated at a pressure of 500 PSI to 1000 PSI and the temperature controlled to 95° F. to 110° F. These operating parameters deliver a permeation rate of 40 LMH, ethanol rejection 40% to 70% and a concentration factor of 2 to 4 times. The product of RO #2 and the product of the overall process of the present invention is the retentate of the system. The permeate is the water removed from the feed stream, which contains a reduced amount of ethanol.

The permeate stream form RO #2 (507) is routed back to the fermentation vessel to retain the ethanol in the stream. The stream consists of 275,172 KG/HR of water and 4147 KG/HR of residual ethanol.

The product of the system (508) is the retentate from RO #2, 164,054 KG/HR (679 GPM) having an ethanol concentration of 130 g/L or 17% v/v ethanol.

This example differs for Example 1 in that the fermentor is kept at a constant starting volume of 825,000 gallons and the ethanol and water removed is replaced with a like volume of converted corn sugar solution. The addition stream (509) contains 42,800 Kg/HR of corn sugar for a 27% w/w solution. The total add is 154,228 KG/HR (679 GPM).

Example 3

As the need for non-oil based fuels increases and the production of grain crops to be turned into ethanol is limited, the use of alternate feedstock becomes highly important. Most of the alternate feedstock materials for conversion to ethanol are plant-based renewable materials, such as wood, grasses and the residues of grain crops. When converted to fermentable sugars, they contain a combination of lignin, hexose sugars from the cellulose fraction as glucose and pentose sugars from the hemicelluloses fraction as xylose. The lignin glue, which holds the cellulose and hemicelluloses fibers together, must be removed from the fermentation media and the fibers then converted to sugars. A mixture of hexose and pentose sugars results, usually high in pentose sugars, which requires less hardy yeasts and bacteria for the fermentation.

Large quantities of waste sugars, which can be converted to ethanol, are found in the wood pulping industry for paper production. Black liquors from the Kraft process and red liquors from the sulfite process are now burned or otherwise discarded. These streams contain high qualities of pentose sugars as xylose and much research has been done to find yeast that converts the sugars to ethanol. *Pichia stipitis* is a common yeast that will do the conversion, but is slow and has a very low ethanol tolerance. Much work has been done to transfer the xylose converting genes from *P. stipitis* to the more hardy *Saccharomyces* yeast, which can also ferment glucose.

Typical fermentations of hemicelluloses to ethanol have ethanol conversions rates of 0.1 to 0.7 GM/L/HR and fermentation times of 50 to 100 hours. Ethanol production is limited to maximum concentrations of 10 GM/L to 40 GM/L. This is well below the comparable fermentation rates of 6 to 20 GM/L/Hr and ethanol distillation concentrations of 80 to 140 GM/L required to make corn ethanol production economical.

Optimized fermentations with gene enhanced *Saccharomyces* yeast could produce a maximum ethanol fermentation rate of 1 GM/L/HR at a maximum ethanol concentration of 20 GM/L, if the ethanol is removed in a continuous feed batch method as described in Example 2. These fermentation characteristics are based upon "Fermentation Kinetics of Ethanol Production Glucose and Xylose by Recombinant *Saccharomyces* 1400(plNH33), Applied Biochemistry and Biotechnology Vol 77-79 1999 pg 373-388".

Example 3 describes the use of sulfite red liquors from a typical sulfite process for conversion to ethanol using the method of Example 2. A typical sulfite pulping system processes 400 Ton/Day dry weight of wood chip and produce 830,000 GPD of red liquor. The sulfite pulping process does the work of dissolving the lignin and also converting the solid hemicelluloses to dissolved wood sugars. The red liquor contains about 3.5% of wood sugars and 10% lignin and other organics. Two membrane processes first separate out the lignin and other high weight organics with a ultra-filtration process and then concentrate the resulting permeate with a nano-filtration or reverse osmosis process, to recover and concentrate the wood sugars. This purification and concentration process produces 3700 KG/Hr (87 GPM) of a 19% wood sugar solution. This amount of material produces about 4.4 MGY of ethanol.

Figure 6:
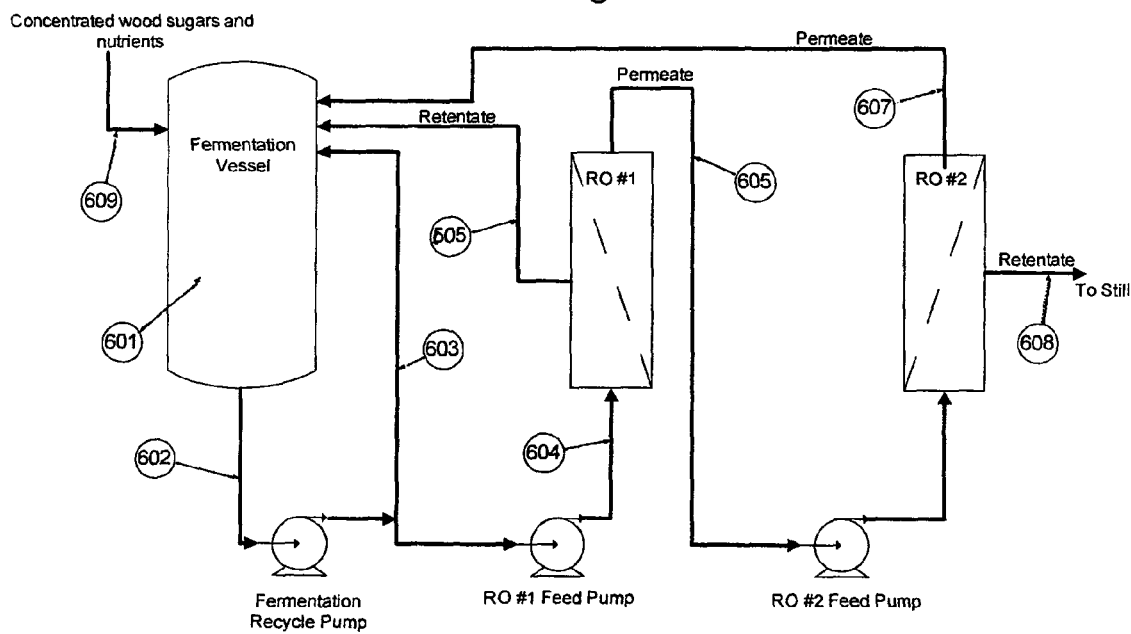
FIG. 6 is a schematic illustration of the process to extract ethanol during active fermentation, concentrate the extracted ethanol and provide a feed to a further ethanol concentration process.

With a standard fermentation to ethanol, at best a 30 GM/L (3% w/w) ethanol solution can be produced with a very long fermentation time. Using the present invention, overall fermentation times are greatly reduced by 2 to 10 times and ethanol concentrations of 90 to 100 G/L are produced. The invention in this example, shown in FIG. 6, is operated with the following parameters.

Several fermentation vessels with the combined volume stated can be used. The starting sugar concentration is only 110 g/L and no unconverted starch is necessary. The fermentation broth consists of fully converted corn sugars and the un-fermentable parts of the corn are filtered to remove high quality animal feed and other chemicals, such as the zien proteins and other useful chemicals.

The fermentation vessel (601) is started with a bioreactor volume of 1,703,000 KG (450,000 Gals) and reaches a steady state ethanol concentration of 20 G/L. Several fermentation vessels with the combined volume stated can be used. The fermentation broth consists of fully converted wood sugars. The starting sugar concentration is only about 44.5 g/L. The red liquor sugar concentrate of 19% is diluted to form the starting sugar concentrate and the appropriate growth nutrients added.

The ethanol production rate is set at of 1 g/L Hr. The total fermentor ethanol production rate is 1703 KG/HR of pure ethanol. The fermentation temperature is controlled in a range of 95° F. to 105° F., by recycling 715,500 KG/HR (3150 GPM) (602) out of the fermentor to be cooled.

A portion of this stream is processed by the present invention to continually remove the amount of ethanol produced to keep the ethanol level at the target concentration. A feed stream of 206,000 KG/Hr (895 GPM) of fermentor solution is routed to RO #1 (604). The stream contains 201,800 KG/HR of water and 4,200 Kg/HR of ethanol. The remaining recycle stream (603) of 509,500 KG/Hr (2250 GPM) is processed through heat exchange equipment and is directly recycled back to the fermentor.

The first system RO #1 functions to remove a clean stream of ethanol and water from the fermentation broth. It is a series parallel arrangement of 8,070 $M^2$ of cellulose acetate membranes, in this case Koch CA 111112-11221. RO #1 is operated at a pressure of 700 PSI to 1200 PSI and the temperature controlled to 95° F. to 110° F. These operating parameters deliver a permeation rate of 15 LMH, ethanol rejection −5% to −15% and a concentration factor of 2 to 3 times. Only ethanol and water is removed from the feed stream in the permeate (filtrate) and the retentate (or concentrate), containing all other fermentation constituents, is recycled back to the fermentor. The ethanol is slightly concentrated in the permeate.

The retentate (605) consists of a total stream of 82,300 KG/HR (350 GPM) consisting of 80,730 KG/HR of water and 1,570 KG/HR of water. The ethanol concentration is slightly less than the feed to the system.

The permeate (606) from RO #1 is the feed stream to RO #2. The feed stream consists of 121,100 KG/HR of water and 2,545 KG/HR of ethanol and little else. This is at an ethanol concentration of 21 G/L of ethanol.

A second system RO #2 concentrates the aqueous ethanol from RO #1 to an ethanol concentration of 40 to 50 G/L or 5% v/v to 6% v/v. It is a series parallel arrangement of 1,820 $M^2$ of PA TFC composite polyamide membranes, in this case Koch PA TFC 111112-11221. RO #2 is operated at a pressure of 500 PSI to 1000 PSI and the temperature controlled to 95° F. to 110° F. These operating parameters deliver a permeation rate of 40 LMH, ethanol rejection 40% to 80% and a concentration factor of 2 to 4 times.

The permeate stream form RO #2 (607) is routed back to the fermentation vessel to retain the ethanol in the stream. The stream consists of 101,700 KG/HR of water and 781 KG/HR of residual ethanol.

The product of the system (608) is the retentate from RO #2, 19,300 KG/HR (87 GPM) having a concentration of 91 g/L or 11.5% v/v ethanol.

The permeate stream form RO #2 (607) is routed back to the fermentation vessel to retain the ethanol in the stream. The stream consists of 72,660 KG/HR of water and 425 KG/HR of residual ethanol.

The retentate (608) from RO #2, 50,560 KG/HR (209 GPM) has an ethanol concentration of 44 g/L or 5.5% v/v ethanol. Because this concentration is not sufficient for economical distillation, a third RO concentration processing step is included.

The product of the system (610) is the retentate from RO #3, 21,100 KG/HR (87 GPM) having an ethanol concentration of 91 g/L or 11.5% v/v ethanol.

In this example, as in Example 2, the fermentor is kept at a constant starting volume of 450,000 gallons and the ethanol and water removed is replaced with a like volume of converted wood sugar solution in this case. The addition stream (609) contains 3,700 Kg/HR of wood sugar for an 18.7% w/w solution. The total add is 19,800 KG/HR (87 GPM).

While the invention has been particularly shown and described with reference to preferred embodiments thereof, it will be understood by those skilled in the art that various changes in form and details may be made therein without departing from the spirit and scope of the invention.

We claim:

1. A method of separating and removing an aqueous ethanol mixture from an active ethanol fermentation broth, the method comprising the steps:
   (a) supplying a selected fraction of the active ethanol fermentation broth to a first reverse osmosis membrane separation stage to generate a dilute aqueous ethanol mixture permeate and a reduced ethanol content fermentation broth retentate;
   (b) recycling the reduced ethanol content fermentation broth retentate to the active ethanol fermentation broth to suppress ethanol inhibition thereof;
   (c) supplying the dilute aqueous ethanol mixture permeate to a second membrane separation stage comprising a reverse osmosis membrane separation system, the first and second membrane separation stages operate at a pressure between about 500 to about 900 PSI and at a temperature between about 110 and about 130 degrees F., to generate a concentrated aqueous ethanol mixture retentate and a dilute aqueous ethanol mixture permeate; and
   (d) recycling the dilute aqueous ethanol mixture permeate of step (c) to the active ethanol fermentation broth to suppress ethanol inhibition thereof.

2. The method of separating and removing an aqueous ethanol mixture from an active ethanol fermentation broth of claim 1, further including the step:
   (e) processing the concentrated aqueous ethanol mixture retentate to remove water there from.

3. The method of separating and removing an aqueous ethanol mixture from an active ethanol fermentation broth of claim 1, wherein the first reverse osmosis membrane separation stage includes a plurality of reverse osmosis membrane separation substages operated in parallel.

4. The method of separating and removing an aqueous ethanol mixture from an active ethanol fermentation broth of claim 3, wherein each first reverse osmosis membrane separation substage includes a plurality of reverse osmosis membrane separation units operated in series.

5. The method of separating and removing an aqueous ethanol mixture from an active ethanol fermentation broth of claim 1, wherein the first reverse osmosis membrane separation stage includes a cellulose acetate reverse osmosis membrane.

6. The method of separating and removing an aqueous ethanol mixture from an active ethanol fermentation broth of claim 1, wherein the second reverse osmosis membrane separation stage includes a thin film composite polyamide reverse osmosis membrane having a retention for ethanol greater than 30%.

7. The method of separating and removing an aqueous ethanol mixture from an active ethanol fermentation broth of claim 1, wherein the membranes of the first and second separation stages are provided in a configuration selected from the group consisting of tubular, hollow fiber, plate and frame, and spiral.

* * * * *